Patented Apr. 12, 1927.

1,624,810

UNITED STATES PATENT OFFICE.

HERMANN SUIDA, OF MODLING, AUSTRIA.

PROCESS FOR THE CONCENTRATION OF DILUTE ACETIC ACID.

No Drawing. Application filed June 18, 1924, Serial No. 720,811, and in Austria June 26, 1923.

As is well known, diluted acetic acid of any desired degree of purity, such as fermentation acid, acetic acid obtained as a waste product in the manufacture of organic preparations and colours by acetylation, crude pyroligneous acid obtained in wood distillation, etc., cannot be converted into a highly concentrated acetic acid of 80% by simple fractional distillation owing to the slight difference between the tensions of the vapours of water and vapours of acetic acid. If it is desired to avoid in the manufacture of the concentrated acetic acid the circuitous way which consists in first making and then decomposing the salts of acetic acid, the only way left for obtaining the acid, will be that of extraction. All the attempts in that direction, hitherto published, are based on the extraction of acetic acid by means of organic solvents which are insoluble or soluble only to a slight extent, in water, but possess a great capacity for dissolving acetic acid, and moreover have a lower boiling point than said acid. Ethyl acetate, benzol, chloroform, etc., have been suggested. The separation of the acetic acid from the solvent is effected by fractional distillation, the solvent being distilled off, and the acetic acid remaining as the residue.

It has always been attempted to complete the separation of acetic acid and water during the extraction by the addition to the diluted acetic acid of an organic salt which reduces the solubility of acetic acid in water. In spite of that, it has been found impossible to prevent more or less large quantities of water from passing into the extracting substance so that the final concentration of the acetic acid left in the residue, was never quite satisfactory. None of the processes tried have been so far utilized in practice, which is probably because they are far from efficient and because of the high price of the solvents utilized.

It has been found that a substantially more favourable result could be obtained with the extraction process by using for the extraction of the diluted acid solvents which are slightly or negligibly soluble in water and have both a high capacity for dissolving acetic acid and a considerably higher boiling point than that of pure acetic acid. If, under such conditions, the acetic acid is almost completely extracted from its diluted aqueous solution by the solvent by some well known process of extraction, for instance in a column apparatus and with the use of the counter-current principle, then, during the subsequent distillation, the solvent will not distill off and leave the acetic acid as a residue, as in the processes above referred to. The acetic acid will, on the contrary, be distilled off, and the solvent will remain as a residue. In that way the process will not only be different in principle from the processes mentioned, but an entirely new technical effect will be obtained. While it is no more possible by this process than with the processes to obtain a 100% acetic acid directly by extraction, nevertheless it is impossible in the processes mentioned, by distilling off the solvent, to eliminate the water which passes into the solvent whereas the treatment of the extraction mixture by my process results in a thorough elimination of the water, that is to say in a further concentration of the acetic acid.

The reason for this phenomenon is that in a ternary mixture of acetic acid-water-solvent of high boiling point, the tension of acetic acid vapours is very greatly reduced, while the tension of the water-vapours is not materially reduced, as steam is dissolved in the solvent to a scarcely perceptible degree, while the vapours of acetic acid are dissolved to a very considerable extent (compare Nernst's "Theoretische Chemie" 8–10 edition, page 116). Such conditions do not exist in the absence of a solvent having a high boiling point, nor in the case of a homogeneous mixture of water and acetic acid, as acetic acid vapours dissolve to a considerable extent in water and steam or vapours of water dissolve to a considerable extent in acetic acid. It is therefore possible to obtain by distillation from such a solvent having a high boiling point, containing for instance only a 30% acetic acid, acetic acids of different concentration, while the solvent remains as a residue if the dephlegmation is carried out properly.

*Example I.*

A 10% aqueous acetate acid and crude tar cresol are passed in opposite direction to each other through a suitable extraction column, the specifically lighter aqueous portion flowing in the upward direction, and the specifically heavier cresol in the downward direction. The escaping aqueous portion then contains a few hundredths per cent of acetic acid, that is to say is practically free from acetic acid, while the tar cresol discharged from the apparatus has extracted practically the whole of the acetic acid from its aqueous solution, certain quantities of water having been, however, also absorbed by the cresol. The cresol charged with acetic acid, is submitted in a still with rectifying column to distillation during which, owing to the great difference between the boiling points of acetic acid and of cresol, it is possible to retain practically the whole of the cresol in the apparatus, while the acetic acid is distilled off with the water still contained in the cresol. By suitably dividing the distillate into two fractions, it is possible to obtain in the first one a 7–10% acetic acid and in the second one a 70–75% acetic acid. While the latter fraction is more particularly suitable for conversion into crude glacial acetic acid, the former fraction is returned to the extraction process and treated jointly with fresh acid of 10%.

*Example II.*

If in a similar manner an approximately 25% aqueous acetic acid is extracted with hydrogenated tar cresol, the acid will also be extracted from the aqueous solution in a practically complete manner, provided that the extraction is carried out in a suitably intensive manner. The hydrogenated cresol discharged yields, when distilled, a distillate which is collected in two fractions, the first one of which contains 23–24% of acetic acid and the second one 80–85% of acetic acid.

If for instance the hydrogenated cresol discharged after the extraction and enriched with acetic acid is distilled in a continuously acting distillation apparatus which does not allow of collection of different fractions, the products obtained will be, on the one hand, hexa-hydro-cresol freed from acid, which will be returned to the extraction process, and on the other hand an aqueous 60% acetic acid.

*Example III.*

If for the extraction of a 25% acetic acid beech wood tar oil having a boiling point 220–245° is used, the process described in the Example I, will yield a 23% diluted acetic acid which is returned to the process and a concentrated 80% acetic acid which is converted directly into glacial acetic acid.

*Example IV.*

If for the extraction of a 10% acetic acid I use a mixture of 4 parts of crude cresol and one part of coal tar oil (anthracene oil) having a high boiling point, the acetic acid will be practically completely extracted, and the subsequent distillation of the extract will yield a 8–10% diluted acid which is returned to the process, and a concentrated 78–80% acetic acid, while the extracting substance from which the acetic acid has been eliminated, may be used for extracting fresh quantities of acetic acid.

The thermic efficiency of the process described could be, however, greatly improved by carrying out the distillation entirely or partly in a vacuum and by utilizing the extracting substance freed from acetic acid, as well as the vapours of the acid distilled off, for heating the solvent coming from the process and charged with acetic acid.

As solvents for the process according to the invention are chiefly suitable organic liquids containing oxygen, for instance organic substances containing the hydroxyl group, with a boiling point above 150° C. Among them may be mentioned: monovalent phenols, except carbolic acid, such as cresols and polyvalent phenols more particularly in the form of their ethers such as for instance guaiacol, its homologues and similar phenols, hydrated phenols, for instance hexa-hydro-cresols, aliphatic and cyclic ketons with high boiling point, further fatty acids with high boiling point, finally natural or artificial mixtures of the above mentioned types of compounds, more particularly heavy wood tar oils (creosotes), brown coal tars and black coal tars.

What I claim is:

A process for the concentration of dilute acetic acid which comprises extracting the dilute acid with a solvent which is substantially insoluble in water, the said solvent dissolving the acetic acid and having a considerably higher boiling point than that of pure acetic acid, separating the acetic acid from the solvent charged with it and returning the solvent separated from the acetic acid for re-use in the extraction process.

In testimony whereof I have hereunto set my hand.

HERMANN SUIDA.